United States Patent
Wu et al.

(10) Patent No.: US 9,778,353 B2
(45) Date of Patent: Oct. 3, 2017

(54) HANDHELD DEVICE, OBJECT POSITIONING METHOD AND COMPUTER-READABLE RECORDING MEDIUM

(71) Applicant: HTC Corporation, Taoyuan (TW)

(72) Inventors: Chun-Yih Wu, Taoyuan (TW); Ta-Chun Pu, Taoyuan (TW); Yen-Liang Kuo, Taoyuan (TW)

(73) Assignee: HTC Corporation, Taoyuan (TW)

( * ) Notice: Subject to any disclaimer, the term of this patent is extended or adjusted under 35 U.S.C. 154(b) by 313 days.

(21) Appl. No.: 14/749,617

(22) Filed: Jun. 24, 2015

(65) Prior Publication Data

US 2016/0377712 A1    Dec. 29, 2016

(51) Int. Cl.
   *G01S 13/10*    (2006.01)
   *G01S 13/86*    (2006.01)
   *G01S 7/41*     (2006.01)

(52) U.S. Cl.
   CPC ............ *G01S 13/867* (2013.01); *G01S 7/411* (2013.01); *G01S 13/10* (2013.01)

(58) Field of Classification Search
   CPC ......... G01S 13/10; G01S 13/867; G01S 7/411
   USPC .......................................................... 342/52
   See application file for complete search history.

(56) References Cited

U.S. PATENT DOCUMENTS

| | | |
|---|---|---|
| 2006/0140449 A1 | 6/2006 | Otsuka et al. |
| 2010/0214154 A1 | 8/2010 | Birdsong, Jr. et al. |
| 2012/0293357 A1* | 11/2012 | Nishigaki ............. G01S 17/023 342/52 |
| 2013/0321620 A1 | 12/2013 | Kim et al. |

OTHER PUBLICATIONS

"Office Action of Deutsches Counterpart Application," issued on Dec. 22, 2016, p. 1-p. 10.

* cited by examiner

*Primary Examiner* — Timothy A Brainard
(74) *Attorney, Agent, or Firm* — Jianq Chyun IP Office

(57) ABSTRACT

A handheld device, an object positioning method thereof and a computer-readable recording medium are provided. The handheld device includes a radar sensor, an image sensor and a control unit. The radar sensor emits a detection wave, and receives a reflected wave generated by an object by reflecting the detection wave. Each object generates one of the reflected waves. The image sensor captures an image. The image includes a subset of the objects. The control unit extracts a waveform signature of each reflected wave, recognizes the waveform signature in a time domain and a frequency domain to determine a first type of each object, obtains a first position of the object according to the reflected wave, obtains a second type and a second position of each object according to the first image, and performs object mapping to combine or compare the first position and the second position of the object.

21 Claims, 4 Drawing Sheets

HANDHELD DEVICE, OBJECT POSITIONING METHOD AND COMPUTER-READABLE RECORDING MEDIUM

BACKGROUND OF THE INVENTION

Field of the Invention

The invention relates to a positioning technique, and particularly relates to a handheld device, an object positioning method and a non-transitory computer-readable recording medium.

Description of Related Art

There are many applications in three-dimensional (3D) scene, for example, virtual reality or refocus of a plurality of objects in a picture, and these applications have been gradually popularized to handheld devices such as smart phones, etc., and these applications all require to detect or calculate positions of a plurality of objects in a 3D space.

A radar can be used to detect a position of an object in the 3D space, though in a radar detection system with a single directional antenna, a relative position of a specific object within an effective irradiation range of the antenna is deduced only according to a radar time of arrival (TOA). If a position of a specific object, for example, a person, a vehicle, a building, etc. in the 3D space is to be obtained, an array antenna has to be used to perform beam scanning. Regardless of an antenna design or back-end operation processing, the above method is hard to be implemented on the handheld devices.

Some high-class handheld devices have two image sensors, which can be used to simulate the human eyes to capture stereo images. These handheld devices can analyze the stereo images by using an image processing algorithm to deduce a general situation of the 3D space. However, in case of a complicated environment, for example, there are too many similar objects in the images, or a too monotonous featureless images are captured, or a characteristic object to be compared in one of the images is shielded due to a viewing angle difference, it is hard to obtain a correct estimation result according to the above method.

SUMMARY OF THE INVENTION

The invention is directed to a handheld device, an object positioning method and a computer-readable recording medium. In the invention, complete and accurate three-dimensional (3D) space positioning of one or a plurality of objects is implemented on a handheld device.

The invention provides a handheld device at least including a radar sensor, an image sensor and a control unit. The radar sensor emits a detection wave, and receives at least one reflected wave generated by at least one object by reflecting the detection wave. Each of the at least one object generates one of the at least one reflected wave. The image sensor captures an image. The image includes a subset of the at least one object. The control unit is coupled to the radar sensor and the image sensor. The control unit extracts a waveform signature of each of the at least one reflected wave, and respectively recognizes the waveform signature in a time domain and a frequency domain to determine a first type of each of the at least one object, the control unit obtains a first position of each of the at least one object according to the at least one reflected wave, obtains a second type and a second position of each of the at least one object according to the image, and performs a mapping operation based on the first type, the second type, the first position and the second position of each of the at least one object to combine or compare the first position and the second position of the at least one object.

The invention provides an object positioning method including following steps. A detection wave is emitted, and at least one reflected wave generated by at least one object by reflecting the detection wave is received, wherein each of the at least one object generates one of the at least one reflected wave. An image is captured, wherein the image includes a subset of the at least one object. A waveform signature of each of the at least one reflected wave is extracted, and the waveform signature is respectively recognized in a time domain and a frequency domain to determine a first type of each of the at least one object. A first position of each of the at least one object is obtained according to the at least one reflected wave. A second type and a second position of each of the at least one object are obtained according to the image. A mapping operation is performed based on the first type, the second type, the first position and the second position of each of the at least one object to combine or compare the first position and the second position of the at least one object.

The invention provides a non-transitory computer-readable recording medium storing a computer program. After a handheld device loads and executes the computer program, the aforementioned object positioning method is implemented.

According to the above descriptions, the simple radar sensor and image sensor are used in collaboration to implement complete and accurate 3D space positioning of one or a plurality of objects on the handheld device.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
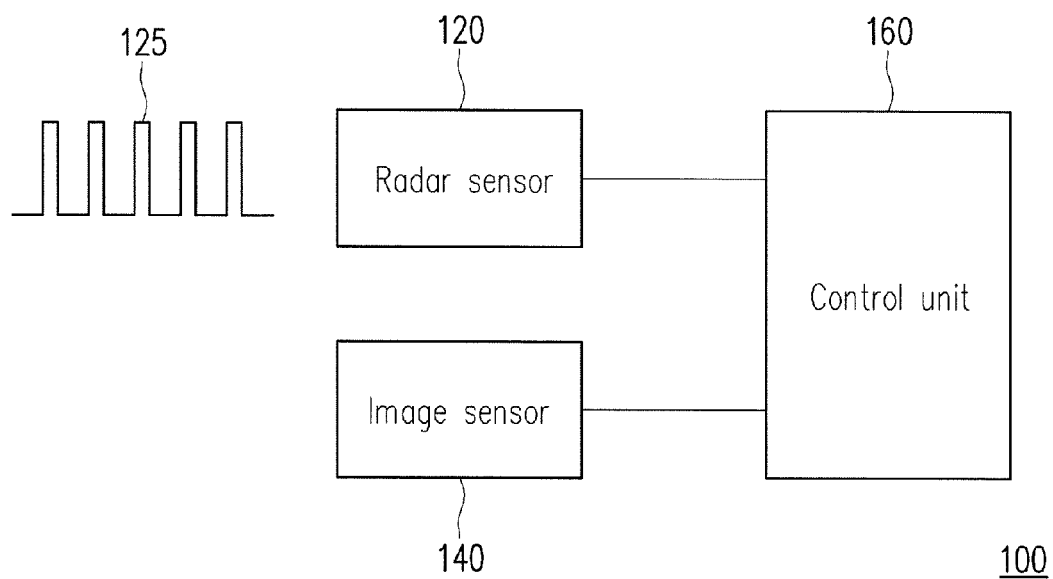
FIG. 1 is a schematic diagram of a handheld device according to an embodiment of the invention.

FIG. 1 is a schematic diagram of a handheld device 100 according to an embodiment of the invention. The handheld device 100 can be a handheld electronic device such as a smart phone, a tablet personal computer (PC), etc. The handheld device 100 includes a radar sensor 120, an image sensor 140 and a control unit 160. The control unit 160 is coupled to the radar sensor 120 and the image sensor 140.

The radar sensor 120 can emit a detection wave, for example, emits a detection wave in form of a continuous pulse sequence 125. The detection wave can be an electromagnetic wave or an ultrasonic wave. The handheld device 100 can be surrounded by one or a plurality of objects. The radar sensor 120 can receive at least one reflected wave generated by the at least one object by reflecting the detection wave. Each of the objects may generate one reflected wave. If the handheld device 100 is a smart phone, the radar sensor 120 can be implemented by an antenna of the handheld device 100.

The image sensor 140 can capture an image, and the image includes a subset of the aforementioned objects. Limited by a field of view (FOV) of the image sensor 140, the subset may include all of the aforementioned objects, or include a part of the aforementioned objects, or include none of the objects.

The control unit 160 may obtain a first type $T_1$ and a first position $P_1$ of each of the objects according to the reflected waves of the aforementioned objects. The control unit 160 may also obtain a second type $T_2$ and a second position $P_2$ of each of the objects according to the captured image. Then, the control unit 160 performs object mapping. The so called "object mapping" is to perform a mapping operation based on the first type $T_1$, the second type $T_2$, the first position $P_1$ and the second position $P_2$ of each of the objects to combine or compare the first position $P_1$ and the second position $P_2$ of the object.

Figure 2:
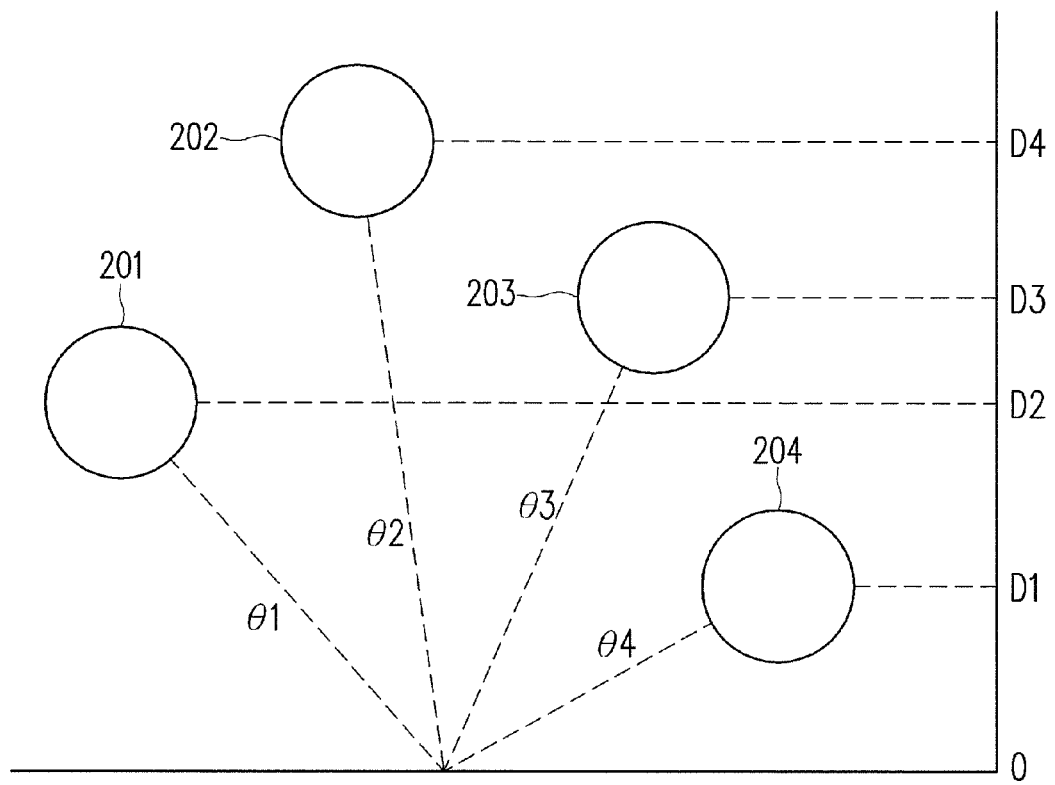
FIG. 2 is a schematic diagram of depths and azimuths of a plurality of objects according to an embodiment of the invention.

For example, the first position $P_1$ can be a depth (i.e., a distance) of the object relative to the handheld device 100, and the second position $P_2$ can be a azimuth of the object relative to the handheld device 100. FIG. 2 is a top view of objects 201-204 located in front of the handheld device 100 according to an embodiment of the invention. The objects 201-204 respectively have depths D1-D4 and azimuths θ1-θ4.

The handheld device 100 may include a waveform signature database. The waveform signature database stores a plurality of waveform signatures and an object type corresponding to each of the waveform signatures. The control unit 160 can extract a waveform signature of the reflected wave of each of the objects, and respectively recognizes the waveform signature in a time domain and a frequency domain according to the waveform signature database, so as to determine the first type $T_1$ of each of the objects. The first type $T_1$ can be mankind, vehicle or building, etc. Moreover, the control unit 160 can calculate the depth $P_1$ of each of the objects according to a time of arrival of the reflected wave of the object. In this way, the obtained first types $T_1$ and the depths $P_1$ are shown as a following table.

| Object | 201 | 202 | 203 | 204 |
|---|---|---|---|---|
| First type $T_1$ | A | B | C | D |
| Depth $P_1$ | D2 | D4 | D3 | D1 |

The handheld device 100 may also include an image signature database. The image signature database stores a plurality of image signatures and an object type corresponding to each of the image signatures. The control unit 160 can perform thresholding and edge detection to each of the objects in the image to extract the image signature of the object. Then, the control unit 160 identifies the image signature according to the image signature database, so as to determine the second type $T_2$ of each of the objects. The second type $T_2$ can be mankind, vehicle or building, etc. Moreover, the control unit 160 can obtain the azimuth $P_2$ of each of the objects according to the position of the object in the image. In this way, the obtained second types $T_2$ and the azimuths $P_2$ are shown as a following table.

| Object | 201 | 202 | 203 | 204 |
|---|---|---|---|---|
| Second type $T_2$ | A | B | C | D |
| Azimuth $P_2$ | θ1 | θ2 | θ3 | θ4 |

If determination results of the first type $T_1$ and the second type $T_2$ of each of the objects are the same, the object mapping can be performed to combine the depth $P_1$ and the azimuth $P_2$ of the object, so a to obtain a complete space position of each of the objects, which is shown in a following table.

| Object | 201 | 202 | 203 | 204 |
|---|---|---|---|---|
| Depth $P_1$ | D2 | D4 | D3 | D1 |
| Azimuth $P_2$ | θ1 | θ2 | θ3 | θ4 |

Figure 3:
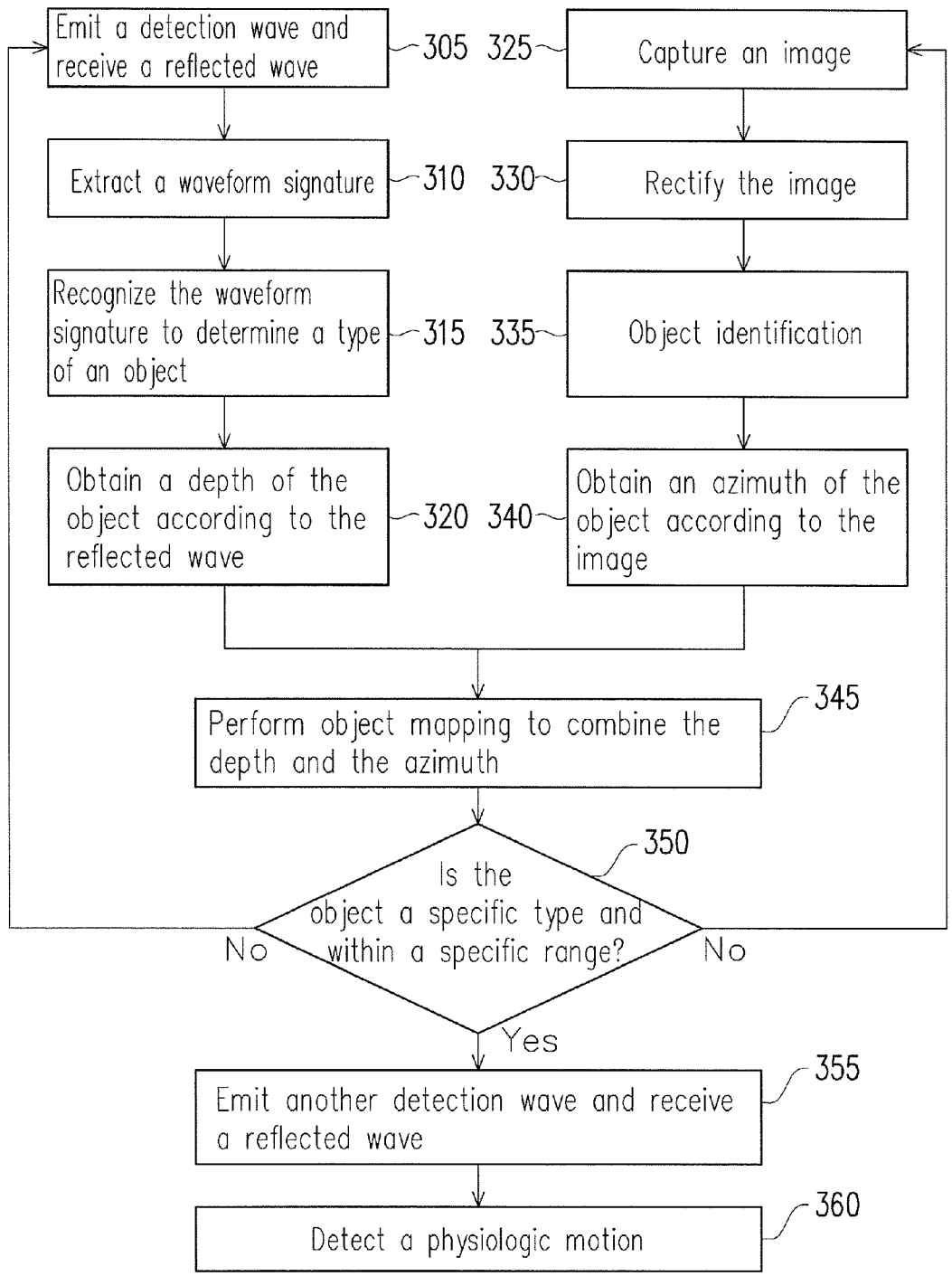
FIG. 3 to FIG. 5 are flowcharts illustrating object positioning methods according to a plurality of embodiments of the invention.

FIG. 3 is a flowchart illustrating an object positioning method according to an embodiment of the invention. In the present embodiment, the first position $P_1$ of each of the objects is a depth of the object relative to the handheld device 100, and the second position $P_2$ of each of the objects is a an azimuth of the object relative to the handheld device 100. In step 305, the radar sensor 120 emits a detection wave, and receives reflected waves of the objects. In step 310, the control unit 160 extracts a waveform signature of the reflected wave of each of the objects. In step 315, the control unit 160 recognizes the waveform signature according to the waveform signature database, so as to determine the first type $T_1$ of the object. In step 320, the control unit 160 calculates a depth of each of the objects according to a time of arrival of the reflected wave of the object.

On the other hand, in step 325, the image sensor 140 captures an image. In step 330, the control unit 160 rectifies the image, i.e., corrects image skew caused by a capturing angle. In step 335, the control unit 160 identifies the object, i.e., extracts an image signature, and identifies the image signature according to the image signature database, so as to determine the second type $T_2$ of the object. In step 340, the control unit 160 determines an azimuth of the object according to whether the object exists in the image. In the present embodiment, the azimuths have two types respectively corresponding to a situation that the object exists in the image and a situation that the object does not exist in the image.

Then, in step 345, the control unit 160 performs object mapping to combine the depth and the azimuth of the object in a manner shown in FIG. 2. In step 350, the control unit 160 checks whether the first type $T_1$ and the second type $T_2$ of the object are a specific type, and the depth and the azimuth of the object are within a specific range. The specific type can be the mankind or other animals having physiologic motions such as breathing, heartbeating, etc. The specific range refers to that the object is in the image, and the depth of the object is within a predetermined range (for example, 1.3-1.7 meters) suitable for measuring the physiologic motions.

When the checking operation of the step 350 obtains a negative result, the flow returns to the step 305 and 325. When the checking operation of the step 350 obtains an affirmative result, in step 355, the control unit 160 controls the radar sensor 120 to emit another detection wave and receives reflected waves of the objects. Both of the detection waves in the step 305 and the step 355 include a plurality of pulses, and a pulse interval of the detection wave of the step 305 is greater than a pulse interval of the detection wave of the step 344. For example, in the step 305, the detection wave with the pulse interval of 1 ms is emitted, and in the step 355, the detection wave with the pulse interval of 0.1 ms is emitted. The detection wave of the step 305 can be used for determining an object position. In step 360, the control unit 160 can use the detection wave of the step 355 to detect subtle physiologic motions such as breathing or heartbeating, etc. The present embodiment can be applied to medical monitoring of old people, infants, injured people or patients.

Figure 4:
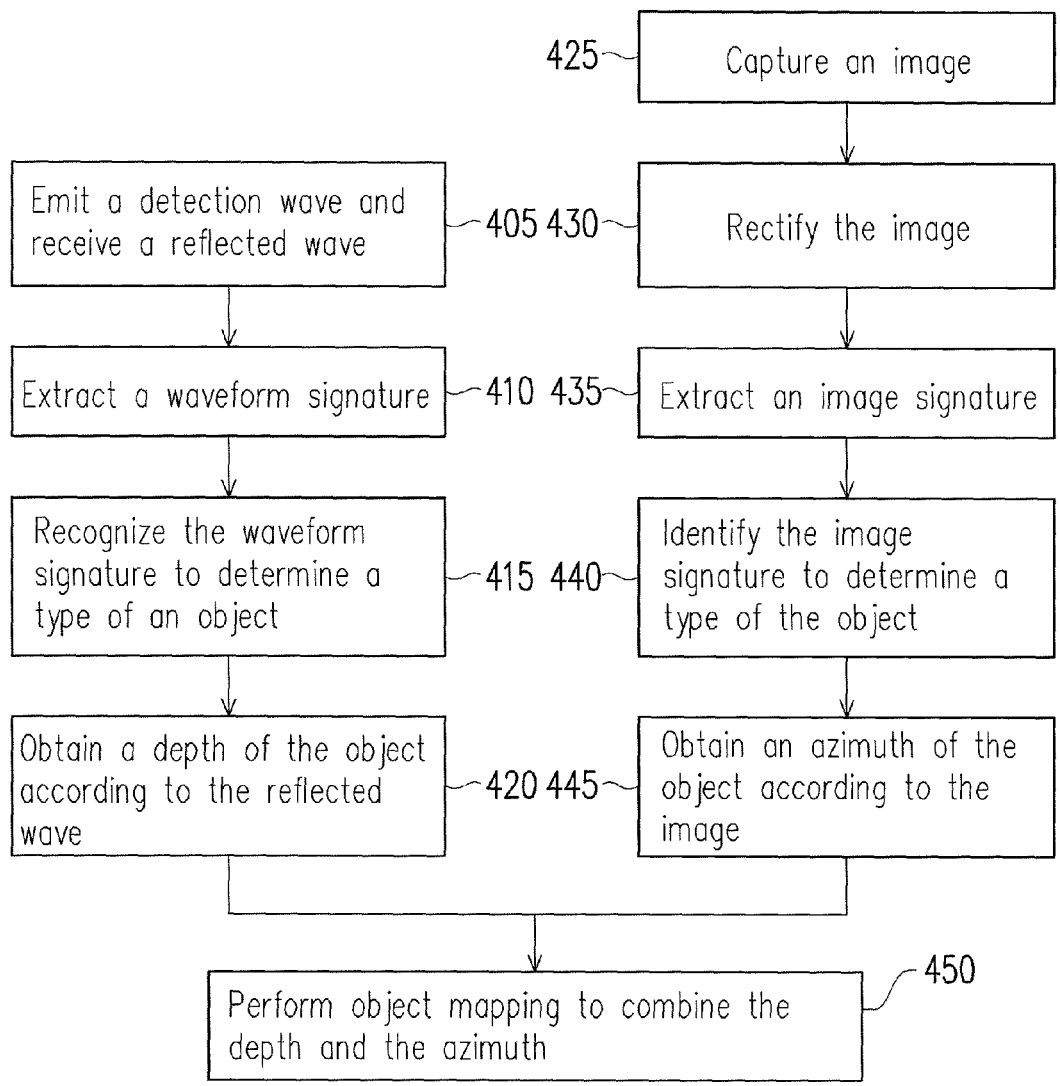

FIG. 4 is a flowchart illustrating an object positioning method according to an embodiment of the invention. In the present embodiment, the first position $P_1$ of each object is a depth of the object relative to the handheld device 100, and the second position $P_2$ of each object is an azimuth of the object relative to the handheld device 100. Steps 405-420 are the same to the steps 305-320. Steps 425, 430 are respectively the same to the steps 325, 330. Steps 435 and 440 are introduced in the embodiment of FIG. 2.

Then, in step 445, the control unit 160 obtains an azimuth of each object according to the image captured by the image sensor 140. In detail, the control unit 160 can divide the image into a plurality of regions, and assigns a corresponding azimuth for each region, and then sets the azimuth of each of the objects as the azimuth corresponding to the region including the object in the regions. The aforementioned azimuth can be a one-dimensional or two-dimensional azimuth.

Then, in step 450, the control unit 160 performs object mapping to combine the depth and the azimuth of each of the objects. In this way, a complete position of each object in the 3D space is obtained, which can be applied for constructing a 3D image or a virtual reality scene, or applied for refocus of a plurality of the objects.

Figure 5:
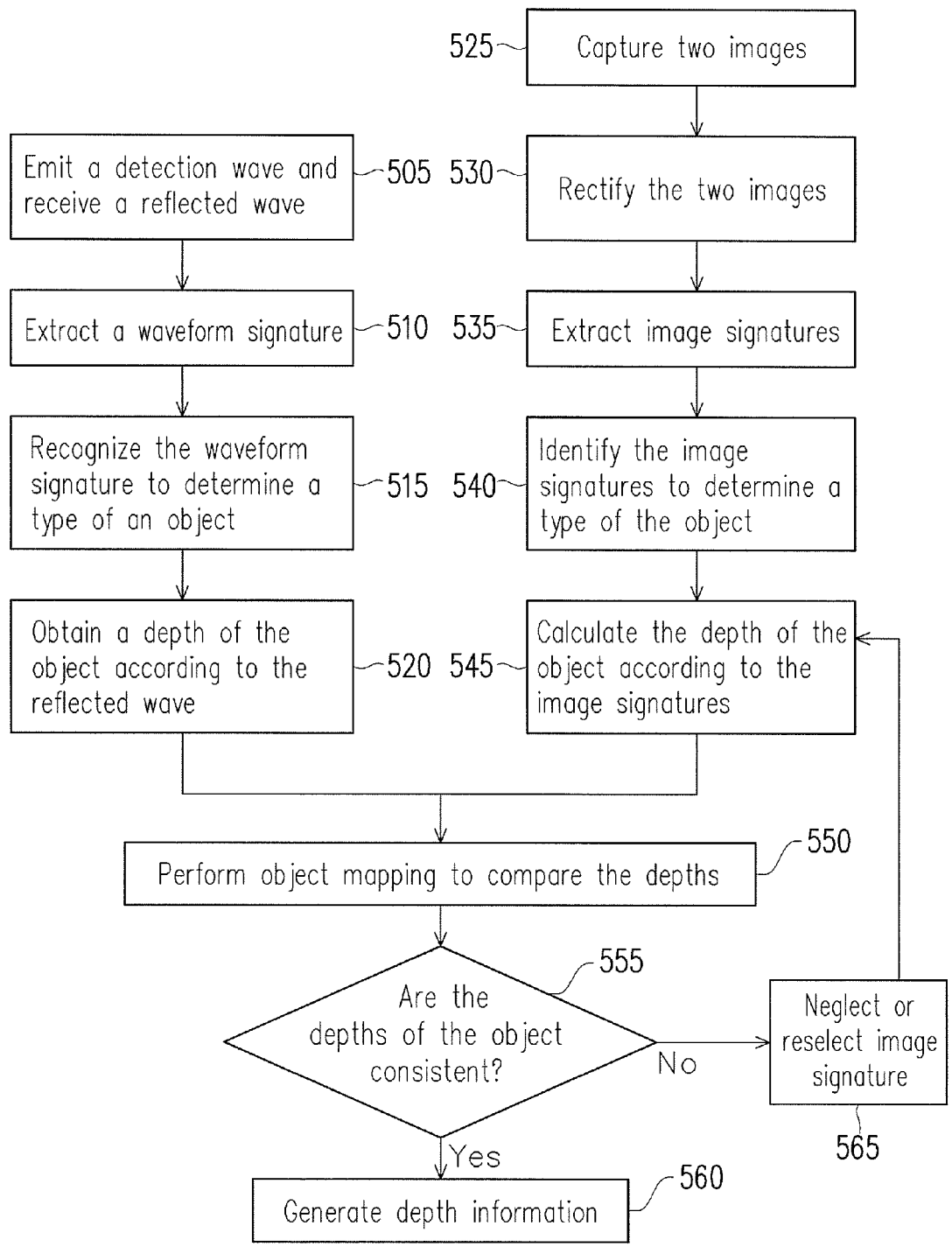

FIG. 5 is a flowchart illustrating an object positioning method according to an embodiment of the invention. In the present embodiment, the first position $P_1$ and the second position $P_2$ of each object are all depths of the object relative to the handheld device 100, and the two depths are respectively come from the radar sensor 120 and the image sensor 140. The image sensor 140 of the present embodiment can simulate human eyes to simultaneously capture two images respectively corresponding to a left eye and a right eye, so that the objects exist in both of the images.

Steps 505-520 are the same to the steps 305-320. In step 525, the image sensor 140 captures the two images. In step 530, the control unit 160 respectively rectifies the two images, and in step S535, the control unit 160 extracts image signatures of the objects in the two images. In step 540, the control unit 160 identifies the image signatures according to the image signature database, so as to determine the second type $T_2$ of each of the objects. In step 545, the control unit 160 obtains a disparity by using image signature matching of the two images, and converts the disparity into the depth of the object.

Then, in step 550, the control unit 160 performs object mapping to compare the depth of the object calculated according to the radar reflected wave and the depth calculated according to the image, and in step 555, the control unit 160 checks whether the two depths are the same. If the two depths are the same, in step 560, the control unit 160 generates depth information of the objects according to the two depths. The depth information can be applied for constructing a 3D image or a virtual reality scene, or applied for refocus of a plurality of the objects.

If the two depths are not consistent, in step 565, the control unit 160 adjusts the image signature of the object, and the flow returns to the step 545 to recalculate the depth of the object coming from the image signature, and re-perform the object mapping of the step 550. The adjustment of the step 565 is to neglect the image signature corresponding to the inconsistent depth or to reselect the image signature of the object corresponding to the inconsistent depth.

In the present embodiment, the radar is used to assist obtaining the correct object depth. If the image is too complicated or too monotonous, the depth estimated only according to the image is probably inaccurate, and if the depth generated according to radar detection is added for comparison, the above problem can be resolved.

The invention also provides a non-transitory computer-readable recording medium, and the recording medium can be a physical storage device such as a memory, a magnetic disk or a compact disk. The recording medium can store a computer program. When the hand held device loads and executes the computer program, the aforementioned object positioning method is implemented.

In summary, in the invention, the radar sensor and the image sensor are simultaneously used to estimate the depths and the azimuths of the objects, so as to obtain a complete object position. In the invention, through collaboration and mapping of the information obtained by the radar sensor and the image sensor, the correct object depths and object positions are obtained. In this way, correct image processing is achieved, and a better 3D image application effect is implemented.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A handheld device, comprising:
a radar sensor, emitting a first detection wave, and receiving at least one reflected wave generated by at least one object by reflecting the first detection wave, wherein each of the at least one object generates one of the at least one reflected wave;
an image sensor, capturing a first image, wherein the first image comprises a subset of the at least one object; and
a control unit, coupled to the radar sensor and the image sensor, extracting a waveform signature of each of the at least one reflected wave, respectively recognizing the waveform signature in a time domain and a frequency domain to determine a first type of each of the at least one object, obtaining a first position of each of the at least one object according to the at least one reflected wave, obtaining a second type and a second position of each of the at least one object according to the first image, and performing a mapping operation based on the first type, the second type, the first position and the second position of each of the at least one object to combine or compare the first position and the second position.

2. The handheld device as claimed in claim 1, wherein the control unit extracts an image signature of each of the at least one object in the first image, and identifies the image signature to determine the second type of each of the at least one object.

3. The handheld device as claimed in claim 1, wherein the first position of each of the at least one object is a depth calculated according to a time of arrival of the at least one reflected wave of the at least one object, and the second position of each of the at least one object is an azimuth of the at least one object determined according to whether the at least one object is in the first image, and the control unit performs the mapping operation to combine the depth and the azimuth of each of the at least one object.

4. The handheld device as claimed in claim 3, wherein the control unit controls the radar sensor to emit a second detection wave to detect a physiologic motion of the at least one object when both of the first type and the second type of the at least one object are a specific type and the depth and the azimuth of the at least one object are all in a specific range.

5. The handheld device as claimed in claim 4, wherein the first detection wave comprises a plurality of pulses, and the second detection wave comprises a plurality of pulses; wherein a pulse interval of the first detection wave is greater than a pulse interval of the second detection wave.

6. The handheld device as claimed in claim 1, wherein the first position of each of the at least one object is a depth calculated according to a time of arrival of the at least one reflected wave of the at least one object, the first image comprises a plurality of regions, each of the regions corresponds to an azimuth, and the second position of each of the at least one object is the azimuth corresponding to the region comprising the at least one object in the regions, and the control unit performs the mapping operation to combine the depth and the azimuth of each of the at least one object.

7. The handheld device as claimed in claim 1, wherein the first position of each of the at least one object is a first depth calculated according to a time of arrival of the at least one reflected wave of the at least one object, the image sensor further captures a second image, both of the first image and the second image comprise the at least one object, the second position of each of the at least one object is a second depth of the at least one object calculated according to an image signature of the at least one object in the first image and the second image, and the control unit performs the mapping operation to compare the first depth and the second depth of the at least one object.

8. The handheld device as claimed in claim 7, wherein when the first depth and the second depth of the at least one object are consistent, the control unit generates depth information of the at least one object according to the first depth and the second depth.

9. The handheld device as claimed in claim 7, wherein when the first depth and the second depth of the at least one object are not consistent, the control unit neglects the image signature corresponding to the inconsistent depth, recalculates the second depth, and re-performs the mapping operation.

10. The handheld device as claimed in claim 7, wherein when the first depth and the second depth of the at least one object are not consistent, the control unit reselects the image signature of the at least one object corresponding to the inconsistent depth, recalculates the second depth, and re-performs the mapping operation.

11. An object positioning method, comprising:
  emitting a first detection wave, and receiving at least one reflected wave generated by at least one object by reflecting the first detection wave, wherein each of the at least one object generates one of the at least one reflected wave;
  capturing a first image, wherein the first image comprises a subset of the at least one object;
  extracting a waveform signature of each of the at least one reflected wave, and respectively recognizing the waveform signature in a time domain and a frequency domain to determine a first type of each of the at least one object;
  obtaining a first position of each of the at least one object according to the at least one reflected wave;
  obtaining a second type and a second position of each of the at least one object according to the first image; and
  performing a mapping operation based on the first type, the second type, the first position and the second position of each of the at least one object to combine or compare the first position and the second position.

12. The object positioning method as claimed in claim 11, further comprising:
  extracting an image signature of each of the at least one object in the first image, and identifying the image signature to determine the second type of each of the at least one object.

13. The object positioning method as claimed in claim 11, wherein the first position of each of the at least one object is a depth calculated according to a time of arrival of the at least one reflected wave of the at least one object, and the second position of each of the at least one object is an azimuth of the at least one object determined according to whether the at least one object is in the first image, and the mapping operation is performed to combine the depth and the azimuth of each of the at least one object.

14. The object positioning method as claimed in claim 13, further comprising:
  emitting a second detection wave to detect a physiologic motion of the at least one object when both of the first type and the second type of the at least one object are a specific type, and the depth and the azimuth of the at least one object are all in a specific range.

15. The object positioning method as claimed in claim 14, wherein the first detection wave comprises a plurality of pulses, and the second detection wave comprises a plurality of pulses; wherein a pulse interval of the first detection wave is greater than a pulse interval of the second detection wave.

16. The object positioning method as claimed in claim 11, wherein the first position of each of the at least one object is a depth calculated according to a time of arrival of the at least one reflected wave of the at least one object, the first image comprises a plurality of regions, each of the regions corresponds to an azimuth, and the second position of each of the at least one object is the azimuth corresponding to the region comprising the at least one object in the regions, and the mapping operation is performed to combine the depth and the azimuth of each of the at least one object.

17. The object positioning method as claimed in claim 11, wherein the first position of each of the at least one object is a first depth calculated according to a time of arrival of the at least one reflected wave of the at least one object, and the object positioning method further comprising:
  capturing a second image, wherein both of the first image and the second image comprise the at least one object, the second position of each of the at least one object is a second depth of the at least one object calculated according to an image signature of the at least one object in the first image and the second image, and the mapping operation is performed to compare the first depth and the second depth of the at least one object.

18. The object positioning method as claimed in claim 17, further comprising:
  when the first depth and the second depth of the at least one object are consistent, generating depth information of the at least one object according to the first depth and the second depth.

19. The object positioning method as claimed in claim 17, further comprising:

when the first depth and the second depth of the at least one object are not consistent, neglecting the image signature corresponding to the inconsistent depth, recalculating the second depth, and re-performing the mapping operation.

20. The object positioning method as claimed in claim 17, further comprising:

when the first depth and the second depth of the at least one object are not consistent, reselecting the image signature of the at least one object corresponding to the inconsistent depth, recalculating the second depth, and re-performing the mapping operation.

21. A non-transitory computer-readable recording medium, storing a computer program, wherein after a handheld device loads and executes the computer program, the object positioning method as claimed in claim 11 is implemented.

* * * * *